April 30, 1968
W. F. OSBORN
3,381,215
MEASUREMENT OF ELECTRICAL RESISTIVITY BY
VARIATION OF MAGNETIC FLUX
Filed Oct. 20, 1965
2 Sheets-Sheet 1
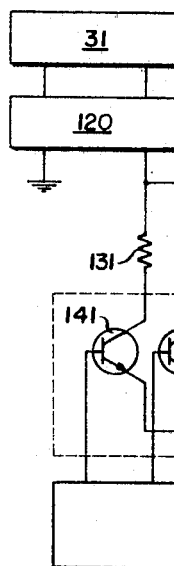
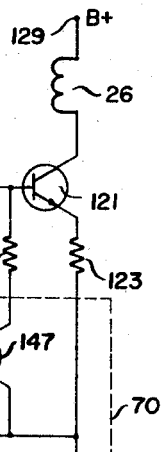
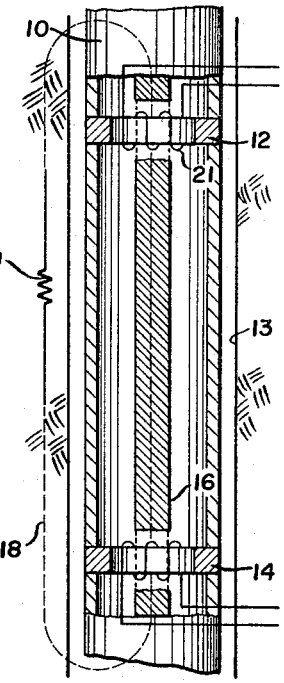
FIG. 4
FIG. 3
FIG. 1
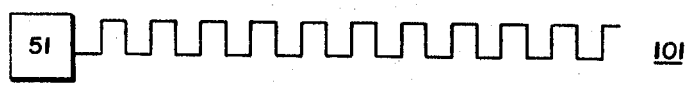
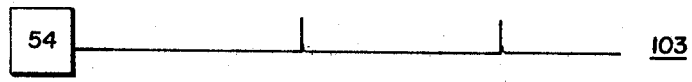
 $Ra > \dfrac{Rb\ N_2\ N_3}{N_1\ N_4} > K Rb$
 $Ra < K_2 Rb$
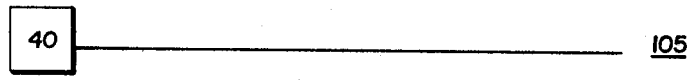 $Ra > K_2 Rb$
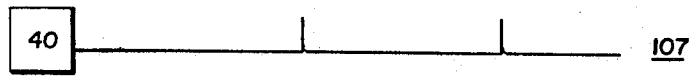 $Ra < K_2 Rb$
 $Ra = K_2 Rb$
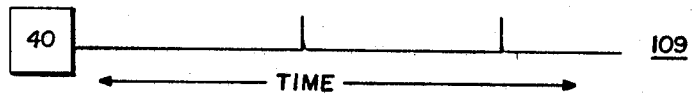 $Ra = K_2 Rb$
← TIME →

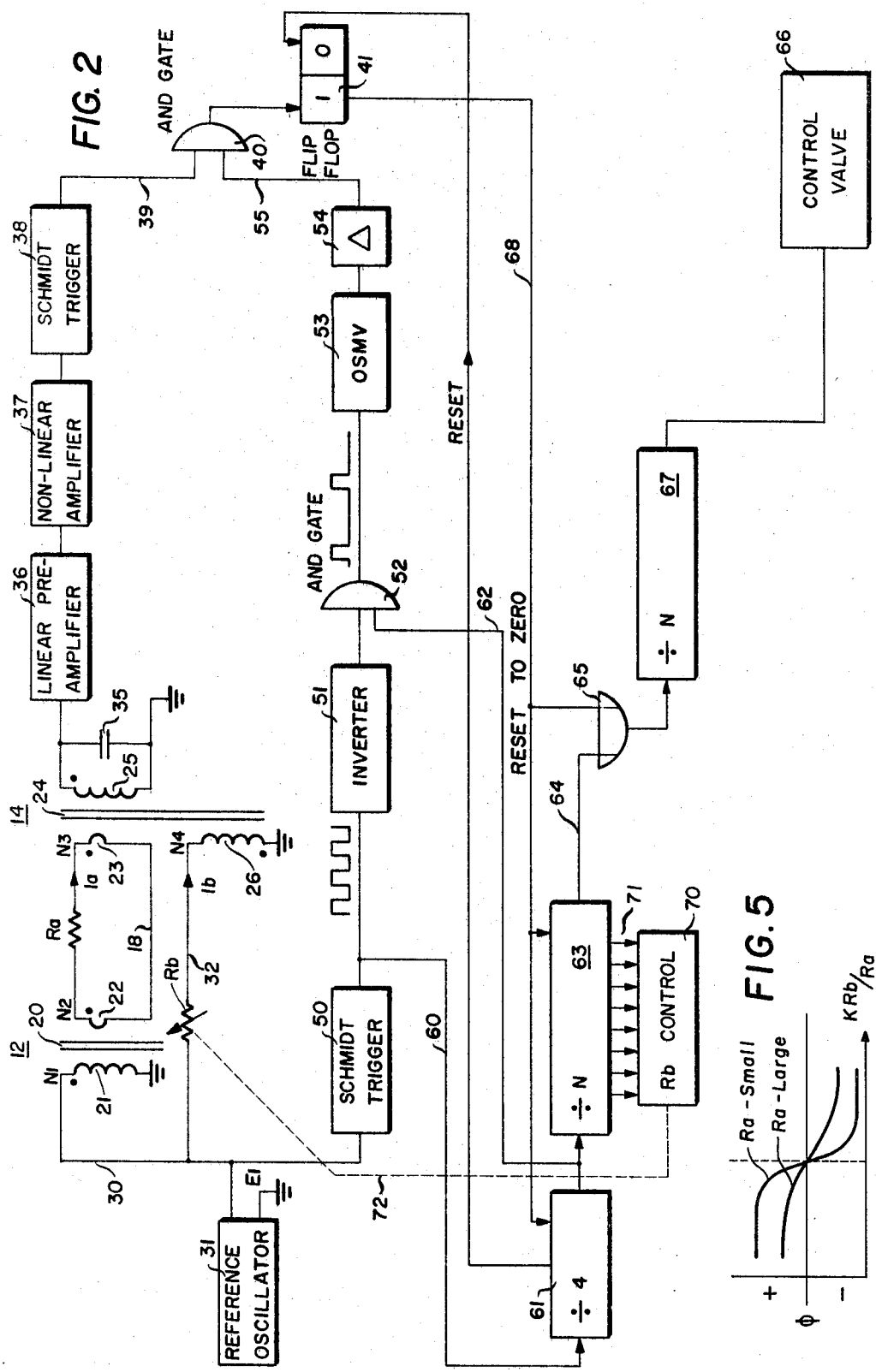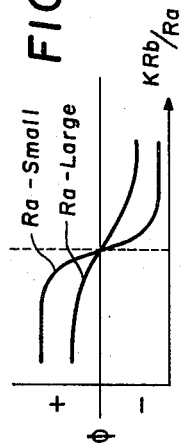

United States Patent Office 3,381,215
Patented Apr. 30, 1968

3,381,215
MEASUREMENT OF ELECTRICAL RESISTIVITY
BY VARIATION OF MAGNETIC FLUX
William F. Osborn, Dallas, Tex., assignor to Arps Corporation, Dallas, Tex., a corporation of Delaware
Filed Oct. 20, 1965, Ser. No. 498,225
12 Claims. (Cl. 324—6)

ABSTRACT OF THE DISCLOSURE

Apparatus for measuring electrical resistivity by variation of a flux component in the second core of a two-core transmitter by means of an auxiliary winding. A control circuit is provided for varying the flux component induced by the auxiliary winding and a phase detector, connected to the transmitter unit, senses the change of phase between two flux components induced into the second core. Means are provided for resetting the control circuit when a phase change occurs and for registering a signal representative of the condition of said control means when a phase reversal occurs.

---

This invention relates to the measurement of the resistivity of a medium by sensing current electromagnetically induced in the medium and, more particularly, to a phase dependent comparison between the induced current and a reference current which is caused repeatedly to vary, thus automatically obtaining the value of the resistivity as a function of time.

It is known to use a pair of spaced apart magnetic toroid cores upon which input and output windings are mounted for measurement of conductivity of an electrolyte. Because of the presence of a great number of variables encountered in the usual environment in which such measurements are to be made, a precise determination of the resistivity of a conductive environment in which the toroids are placed is difficult.

The present invention is directed to a new and improved method and system for measurement of resistivity in which the flux in a receiving toroid is driven through a null in accordance with a predetermined time schedule and the instant in such schedule at which the null occurs is detected, as by sensing a change in phase of the flux.

In a more specific aspect, the invention involves a pair of spaced apart magnetic toroidal cores, one of which has an input winding and the other of which has an output winding. A current source is connected to the input winding on a first core to induce a magnetic flux component in the second core. An auxiliary winding, connected to the same source by way of a variable resistance, is employed to induce a second flux component in the second core and, upon variation of the resistance, to cause variation in the total flux in the second core. A control system is employed repeatedly to vary the resistance in accordance with a predetermined time schedule. A detector is then employed for sensing each instant in each time schedule at which the phase of the first flux component relative to the phase of the second flux component changes from one sense to the opposite sense, as from a leading phase to lagging phase.

In a further aspect of the invention, the magnetic toroids form a part of a well logging system in which a conductor extends through both of the cores. This arrangement causes the current linking the two toroids to be effected in such a manner that substantially the only independent variable affecting the measurements of the system is the resistivity of the earth formations.

In accordance with the present invention, the resistance to flow of current induced in a path coupled from an electromagnetic transmitter to an electromagnetic receiver is measured. A circuit is provided for inducing a bucking voltage into the receiver in phase opposition to the voltage induced in the receiver by excitation of the transmitter. A control circuit is provided for varying the magnitude of the bucking voltage monotonically. A phase detector is connected to the transmitter unit and to the receiver unit for sensing the change of phase of the output of the receiver with respect to the transmitter which occurs when the induced magnetomotive force and the bucking magnetomotive force in the receiver are equal. Means are provided for resetting the control circuit when phase change occurs and for registering a signal representative of the point on the monotonic function at which the phase change occurred.

For a more complete understanding of the present invention and for further objects and advantages thereof, reference may now be had to the following description taken in conjunction with the accompanying drawings in which:

FIGURE 1 illustrates a well logging system to which the present invention is particularly adapted and with respect to which an embodiment will be described;

FIGURE 2 illustrates one embodiment of the present invention;

FIGURE 3 illustrates the time relationships involved in the operation of the system of FIGURE 2;

FIGURE 4 illustrates a variable effective resistance simulating circuit; and

FIGURE 5 illustrates phase relations induced in measurement of Ra.

In FIGURE 1, a logging system is illustrated in which a toroidal electromagnetic transmitting unit 12 is supported by a borehole unit 10 in a borehole 13. Unit 12 is spaced from a toroidal electromagnetic receiving unit 14. A winding 21 in the unit 12 is excited by alternating current to induce current flow in the borehole 13 and in the adjacent formations as indicated by the current path 18.

When a conductive structure in unit 10, represented by conductor 16, links the units 12 and 14, current induced by excitation of unit 12 will link unit 14 and thus may be considered to flow in a path represented by the current path 18. The resistance in the path 18 may be represented by a single lumped resistance Ra. Where the resistance of the structure 16 is very small, Ra may represent the total resistance to current flow, hence the resistance presented by the earth formations.

It is well known that an accurate measurement of the resistance of the formation along the length of the borehole 13 provides valuable data relative to the petroleum and other mineral-bearing properties of such formations.

Measurements in boreholes are beset by problems, including those due to elevated and varying temperature and pressure and the problem of supplying power. Accurate measurements of the value of Ra have been found to be difficult to obtain. The present invention is directed to a system and a method of operation such that an electromagnetically coupled system is used accurately to measure the resistivity encountered by the induced current.

One embodiment of such a system is illustrated in FIGURES 2 and 4 where like parts have been given the same reference characters as in FIGURE 1. The toroid unit 12 is represented by a core 20 having a primary winding 21 and a secondary winding 22. A resistance $Ra$ is connected in series with the secondary winding 22 and with a winding 23 associated with the core 24 of the receiving toroid 14. It is understood that windings 22 and 23 and the resistance $Ra$ comprise the path 18 of FIGURE 1.

A detector winding 25 is also wound on core 24 along with a third winding 26. With the resistance $Ra$, representing the resistance of the earth, the single-turn current loop 18, represented by the windings 22 and 23, links the cores 20 and 24 together.

The excitation winding 21 is connected by way of channel 30 to a reference oscillator 31. An A.C. output voltage E1 is applied to the winding 21. A channel 32 connects a resistance $Rb$ to the winding 26 and the source 31 in a series circuit relationship.

The flux produced in core 24 due to current flow in loop 23 is opposite in sense with the flux due to current flow in coil 26. Upon variation of the resistance $Rb$, the magnetomotive force induced in the secondary winding 25 on the core 24 will be varied. By varying the resistance $Rb$, the magnetomotive force induced in the secondary winding 25 can be driven through a null point.

In accordance with the present invention, a phase transition is sensed as the flux in unit 24 passes through a null. A highly accurate phase measurement at the point at which the phase goes through zero, hence null, is employed to provide an accurate indication of the resistance $Ra$, since, at null, $Ra$ and $Rb$ are proportional.

The detector winding 25 is connected in parallel with a condenser 35. The winding 25 is thus tuned, though not sharply. Preferably the tuned circuit is slightly on the capacitive side with reference to the frequency of the output of oscillator 31. This is done to facilitate the reception of a clean voltage waveform and to minimize loading of the winding 25 by the detecting circuit. The output of the winding 25 is applied to a linear preamplifier 36 and then by way of a non-linear amplifier 37 to a Schmitt trigger 38. The output of the Schmitt trigger 38 is connected by way of line 39 to an AND gate 40 which drives a flip-flop 41. A second channel 55 is also connected to AND gate 40. Normally the voltage from the Schmitt trigger 38 leads the voltage on the second channel 55. As resistance $Rb$ is varied, the phase relations change such that the voltage from the Schmitt trigger 38 lags the voltage at the second channel 55.

In accordance with the invention, the resistance $Rb$ is varied cyclically. The instant in time in each cycle at which the voltage from the Schmitt trigger 38 just lags the voltage on the second channel 55 is detected. The resistance $Rb$ at such instant is then related to the value of $Ra$, as will be explained.

The reference voltage on channel 55 for the AND gate 40 is supplied from the output of the oscillator 31 by way of a Schmitt trigger 50. The output of the Schmitt trigger 50 is applied by way of an inverter 51 and an AND gate 52 whose output is applied to a single shot multivibrator 53. The output of the multivibrator 53 drives a differentiator 54 whose output is connected by channel 55 to the second input of the AND gate 40.

The output of the Schmitt trigger 50 is connected by way of channel 60 to the input of a pulse divider 61 which is comprised of two flip-flops. The output of the pulse divider 61 is connected by way of channel 62 to the second input of AND gate 52. The pulse divider 61 is also connected to the input of a second flip-flop pulse divider 63 whose output is coupled by way of channel 64 to an OR gate 65. The output of the OR gate 65 drives the input of another divider 67. The output of the divider 67 drives the input of a control valve 66 which, in the example here described, may be of the type employed in mud streamtelemetering in connection with the system described in U.S. Patent No. 2,524,031 and other related patents issued to J. J. Arps. The control valve system 66 is employed in this example to illustrate introduction into a mud stream in a drilling well of pulse time modulation signals which are representative of the value of the resistance $Ra$.

The second input of the OR gate 65 is by way of a flip-flop 41 whose one state output is applied to channel 68. Channel 68 also is connected to the reset terminals of the pulse dividers 61 and 63. The pulse divider 63 drives a control unit 70 by way of linkages 71. Control unit 70 is coupled to the resistance $Rb$, to vary the resistance $Rb$ monotonically following each reset pulse appearing on the channel 68. The effective resistance of the resistor $Rb$ repeatedly is varied in accordance with a ramp function under control of unit 70 with each step in the ramp preset both as to time and magnitude. The maximum height each ramp achieves is then dependent upon the value of the resistance $Ra$. The length or time duration of each ramp is then employed as the pulse time information which is utilized in the valve unit 66.

The linkage 72 has been indicated as a mechanical linkage to illustrate in a general way the relationships between the elements of FIGURE 2. However, in a preferred embodiment, as will hereinafter be shown, an electronic linkage is employed wherein resistances of selected values are switched into and out of the channel 32 under control of unit 70.

Before describing the latter system, it will be helpful to consider the waveforms of FIGURE 3. The units of FIGURE 2 are shown in block form along the left side of FIGURE 3 and the waveform related thereto is illustrated to the right of each such unit. Briefly, the signals applied to the input of the Schmitt triggers 38 and 50 are shaped at the output as square waves. The square waves from the Schmitt trigger 38 are applied directly to the AND gate 40. The output of Schmitt trigger 50, applied to the inverter 51 and AND gate 52, is differentiated at the output of the single shot multivibrator 53 by the unit 54. Thus, time reference pulses appear on channel 55. The reference pulses occur at the trailing edge of the output voltage from the single shot multivibrator 53.

More particularly, in FIGURE 3, the waveform 101 represents the voltage at the output of inverter 51 which is the output of oscillator 31 after being squared and inverted. The AND gate 52 has an output represented by the waveform 102. The pulse output 102 is divided from the output 101 by a factor of four by action of AND gate 52. More particularly, this division is accomplished by applying the output of the divider 61 by way of channel 62 to the second input of AND gate 52. The output of the AND gate 52 is applied to the one shot multivibrator 53. The resultant output from differentiator 54 is represented by the waveform 103. The pulses on waveform 103 provide a time reference relative to the phase changing output from the Schmitt trigger 38.

The waveform 104 represents the output of the Schmitt trigger 38 when the resistance $Ra$ is greater in proportion than $Rb$. Waveform 105 represents the output from the AND gate 40 for this condition, i.e.: as long as $Ra$ is greater than $kRb$, no pulses will appear at the output of unit 40.

The waveform 106 illustrates the output of Schmitt trigger 38 when $Ra$ is less than $kRb$. The waveform 107 illustrates the resultant output of the AND gate 40. The pulse output from the differentiator 54 will be permitted to pass through the AND gate 40 and to the flip-flop 41 to change its state.

Waveforms 108 and 109 represent the condition when the current flowing in resistance $Ra$ causes a flux via the winding 23 to equal the flux caused by the current flowing through $Rb$ and the coil 26. In this case, there will similarly be output pulses as indicated by the waveform 109. Such output pulses will begin to appear in the system only when the flux induced by current flow in the loop 23 equals the flux induced in the core 24 by current flow in winding 26.

The single shot multivibrator 53 is so constructed as to have a period which will position the output pulse therefrom, as represented by the waveform 103, in such a manner as to compensate for the delays and time shifts encountered in the Schmitt trigger 50, the inverter 51, the preamplifier 36, the amplifier 37, and the Schmitt trigger 38. More particularly, the period of the one shot multivibrator 53 initially is set so that the zero phase condition will occur when the quantity $kRb$ exactly equals a known value of resistance $Ra$. In this condition, unknown values of $Ra$ may then be measured as a function of the time variations in $Rb$.

In FIGURE 4, the electronic counterpart of the resistance $Rb$ of FIGURE 2 has been illustrated. The system is excited from the oscillator 31. The output signal of the oscillator 31 is applied to a unit 120 which provides output current which is proportional to the voltage applied from the source 31. This output current will remain constant even though the load changes, constant current A.C. sources being well known in the art. The output from the constant A.C. current source 120 is connected directly to the base of an emitter-follower transistor 121 whose emitter is connected by way of resistance 123 to ground and whose collector is connected by way of the winding 26 to a supply terminal 129.

The line 122 is connected to a plurality of resistance and switch channels. More particularly, resistances 131–137, connected to line 122, may be selectively connected to ground by switches 141–147. The switches 141–147 are transistor switches which are controlled by the control unit 63. Any one or all of the resistances can be switched into the circuit so that there will be produced a voltage on the base of the emitter-follower 121 which is dependent upon the effective resistance between conductor 122 and ground. This effective resistance is varied by switching selected ones of the resistances 131–137 in and out of the circuit. The effective resistance between the conductor 122 and ground, varies monotonically as the unit 63 switches resistors 131–137 in and out. This effective resistance is made to follow the quantity $Rd/n$, where $n$ is the number of output levels applied from unit 63 following reset. By way of example, the resistances 131–137 may be graded in the resistance values thereof in accordance with the relationship 32–16–8–4–2–1, respectively. By suitable control, such as is well known in the art, the switches 141–147 may be selectively opened and closed so that the resistance between the line 122 and ground will vary inversely proportional to time. This will cause a voltage to occur on line 122, which varies in magnitude inversely in proportion to time. This voltage, applied to the base of transistor 121, causes current to flow through the collector of the transistor 121 and hence through coil 26 that varies inversely proportional to time. The current flow through $Rb$ and winding 26 must vary inversely with respect to time, as $Rb$ increases with respect to time. The circuit of FIGURE 4 produces this action and thus may be considered collectively to form resistance $Rb$.

In the system thus described, the detection of phase change in the manner described permits a measurement of $Ra$ which is independent of the method by which the phase is detected. It is also independent of the method by which $Rb$ is created as well as the method of coupling or detecting the unique condition when the two opposing fluxes are equal. The invention allows the system to be independent of variations in oscillator voltage, core characteristics, permeability, as effected by variation in temperature. Effectively, variations in many parameters are eliminated so that the system is only dependent upon the number of turns on the windings 21, 22, 23, 25, and 26 which are constant, and the values of resistances 131–137. In accordance with known techniques, the latter values can be stabilized so that they will not represent variables in the system. Thus, $Ra$ is the only effective independent variable.

From the foregoing it will now be understood that the resistance shown in lumped form in FIGURE 2 is to be taken as a schematic representation of the electronically variable resistance $Rb$ shown in FIGURE 4.

From the graph of FIGURE 5, it will be seen that when $kRb/Ra=1$, there is a rapid transition in the phase relation between the current flowing in path 18 relative to the current flowing in winding 26. For small values of $Ra$, the phase transition is more rapid than for large values. In either case, the system illustrated in FIGURES 1 and 4 provides for a precise measurement of the instant in time relative to the variation of resistance $Rb$ that the phase change occurs.

It will now be apparent that the invention will be useful not only in the logging environment above described, but also for other measurements where conductivity is to be evaluated. For example, the invention would be useful in measurement of the salinity of solutions employed in chemical processes. Other environments may be found to require measurements of the type involved herein.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system for measuring electrical resistivity of a medium where a first magnetic toroidal core adapted to be coupled magnetically to said medium has an input winding and is spaced from a second magnetic toroidal core which has an output winding, the combination which comprises:
    (a) an alternating current source for energizing said input winding to induce a first magnetic flux component in said second core,
    (b) an auxiliary winding on said second core connected in circuit with a variable resistance and with said source for inducing a second flux component in said core and to vary the total flux in said second core,
    (c) control means for repeatedly varying said resistance from a starting value in accordance with a predetermined program,
    (d) means connected to said output winding for generating a reset signal to said control means to return said resistance to the starting value when the phase of said first flux component relative to the phase of said second flux component changes from one sense to the opposite sense, and
    (e) means coupled to said control means and responsive to said reset signal for producing a signal proportional to the value of said resistance when said phase change occurs.

2. The combination set forth in claim 1 in which said alternating current source is a constant current source and a control voltage is developed by varying said resistance through which a constant current flows.

3. In a system for measuring electrical resistivity of earth formations where a first magnetic toroidal core adapted to be coupled magnetically to said formations has an input winding and is spaced from a second magnetic toroidal core which has an output winding, the combination which comprises:
    (a) an alternating current source connected to said input winding to induce a first magnetic flux component in said second core,
    (b) a conductor extending through both of said cores for linking to said second core substantially all of the current produced by flux in said first core to maximize said first flux component, (c) an auxiliary winding on said second core connected in a circuit with a variable resistance and with said source for inducing a second magnetic flux component in said second core to vary the total flux in said second core, (d) control means for repeatedly varying said resistance from a starting value in accordance with a predetermined program, (e) means connected to said output winding for generating a reset signal to said control means to return said resistance to the starting value when the phase of said first flux component relative to the phase of said second flux component changes from one sense to the opposite sense, and (f) means coupled to said control means and responsive to said reset signal for producing a signal proportional to the value of said resistance when said phase change occurs.

4. The combination set forth in claim 3 in which said resistance means includes a plurality of graded resistance elements each in series circuit with selectively actuated switch means wherein the switch means are closed and opened in accordance with a predetermined program to cause said second induced flux component to vary in accordance with a stair-step schedule.

5. The combination set forth in claim 4 wherein said source is a constant current source and is connected to each said series circuit and to the base of a transistor and wherein said auxiliary winding is connected in the current circuit for said transistor whereby the voltage on the base of said transistor governs the magnitude of said second flux component.

6. A well logging system which comprises:

(a) an elongated tubular conductive body adapted to be positioned in a well bore, (b) a transmitting toroid having an input winding mounted at a first point along the length of said body, (c) a receiving toroid having an output winding mounted at a second point along said body, spaced from said first toroid, (d) an alternating current source connected to said input winding to induce a first magnetic flux component in said second core by flow of current through said conductive body and from said conductive body through adjacent earth formations, (e) an auxiliary winding on said receiving toroid connected in circuit with a variable resistance and with said source for inducing a second flux component in said second core and for varying the total flux in said second core, (f) control means for repeatedly varying said resistance from a starting value in accordance with a predetermined program, and (g) means connected to said output winding for generating a reset signal to said control means to return said resistance to the starting value and indicating when the phase of said first flux component relative to the phase of said second flux component changes from one sense to the opposite sense.

7. In a well logging system where an elongated tubular conductive body is adapted to be positioned in a well bore and has a transmitting toroid and a receiving toroid mounted at spaced points along said body with an alternating current source connected to said transmitting toroid to induce a first magnetic flux component in said second core by flow of current through said conductive body and from said conductive body through adjacent earth formations, the combination which comprises:

(a) an auxiliary winding on said receiving toroid connected in a circuit with a variable resistance and with said source for inducing a second flux component in said second core and for varying the total flux in said second core, (b) control means for repeatedly varying said resistance from a starting value in accordance with a predetermined program, and (c) means including an output winding on said receiving toroid for generating a reset signal to said control means to return said resistance to the starting value and indicating when the phase of said first flux component relative to the phase of said second flux component changes from one sense to the opposite sense.

8. In a well logging system where an elongated tubular conductive body is adapted to be positioned in a well bore and has a transmitting toroid mounted at a first point along the length of said body, and a receiving toroid mounted at a second point along said body, spaced from said transmitting toroid, the combination which comprises:

(a) an alternating current source connected to said transmitting toroid to induce a first magnetic flux component in said receiving toroid by flow of current through said conductive body and from said conductive body through adjacent earth formations, (b) an auxiliary winding on said receiving toroid connected in circuit with a variable resistance and with said source for inducing a second flux component in said receiving toroid and for varying the total flux in said receiving toroid, (c) control means for repeatedly varying said resistance from a starting value in accordance with a predetermined program, and (d) means including an output winding on said receiving toroid for generating a reset signal to said control means to return said resistance to the starting value and indicating when the phase of said first flux component relative to the phase of said second flux component changes from one sense to the operative sense.

9. The combination with a logging system, wherein a first toroid with a first coil thereon is spaced from a second toroid having a detecting coil thereon, adapted to be lowered into a borehole, of:

(a) an alternating current source connected to said first coil to induce alternating current in the medium surrounding said first toroid, (b) conductor means extending through both of the toroids to link all said induced current to said second toroid to produce a first flux component in said second toroid, (c) an auxiliary coil on said second toroid connected in circuit with said source to induce a second flux component in said second toroid in phase opposition to said first flux component, (d) control means for repeatedly varying said second flux component from a starting value in accordance with a predetermined program with said second flux component attaining a value at least equal in magnitude while out of phase with said first flux component to null the total flux in said second toroid, and (e) detecting means connected to said detecting coil and to said source for detecting each null in said total flux to generate a reset signal to said control means to return said second flux component to the starting value.

10. The combination set forth in claim 9 in which said variations in said second flux components are like monotonic functions of time and said detecting means includes means to measure the time in each of said functions at which said null occurs.

11. The combination set forth in claim 9 in which said control means comprises resistance means in circuit with said source and said auxiliary coil for varying the magnitude of said second flux component by varying the current in said auxiliary coil.

12. The combination set forth in claim 9 in which said control means includes a plurality of resistances and a like plurality of switches and means for selectively actuating said switches to change the current in said auxiliary coil stepwise in accordance with a predetermined time-amplitude function.

References Cited

UNITED STATES PATENTS

| | | | |
|---|---|---|---|
| 2,264,318 | 12/1941 | Lee | 324—6 |
| 2,987,668 | 6/1961 | Gondouin | 324—6 |
| 3,047,794 | 7/1962 | Bennett et al. | 324—10 |
| 3,079,549 | 2/1963 | Martin | 324—6 XR |
| 3,305,771 | 2/1967 | Arps | 324—6 |

RUDOLPH V. ROLINEC, *Primary Examiner.*

G. STRECKER, *Assistant Examiner.*